United States Patent [19]
Dano

[11] 3,938,146
[45] Feb. 10, 1976

[54] SECURE ENCODER FOR TRILATERALIZATION LOCATOR UTILIZING VERY NARROW ACCEPTANCE PERIODS

[75] Inventor: Paul K. Dano, Euless, Tex.

[73] Assignee: Del Norte Technology, Inc., Euless, Tex.

[22] Filed: Apr. 1, 1974

[21] Appl. No.: 457,145

[52] U.S. Cl. ........... 343/6.5 LC; 328/110; 328/119; 343/6.8 LC; 343/17.1 PF
[51] Int. Cl.² ............................................ G01S 9/56
[58] Field of Search ......... 343/6.5 R, 6.5 LC, 6.8 R, 343/6.8 LC, 17.1 PF, 17.7; 328/110, 119

[56] References Cited
UNITED STATES PATENTS

| | | | |
|---|---|---|---|
| 2,975,404 | 3/1961 | Kups | 343/6.5 R |
| 3,040,260 | 6/1962 | Nichols | 328/110 |
| 3,518,668 | 6/1970 | Woollvin | 343/6.8 LC |
| 3,680,091 | 7/1972 | Rutherford et al. | 343/6.5 R |

*Primary Examiner*—Maynard R. Wilbur
*Assistant Examiner*—Gregory E. Montone

[57] ABSTRACT

A system for radar station identification depends primarily upon the encoding growing out of a pulse repetition rate of interrogation pulses. To secure the encoding, one or more pulses arm the system and succeeding pulses must be detected during an extremely narrow time of acceptance. Hence, the pulses are logically interpreted in order to reject randomly occurring stray signals.

7 Claims, 2 Drawing Figures

DETECTOR SECTION

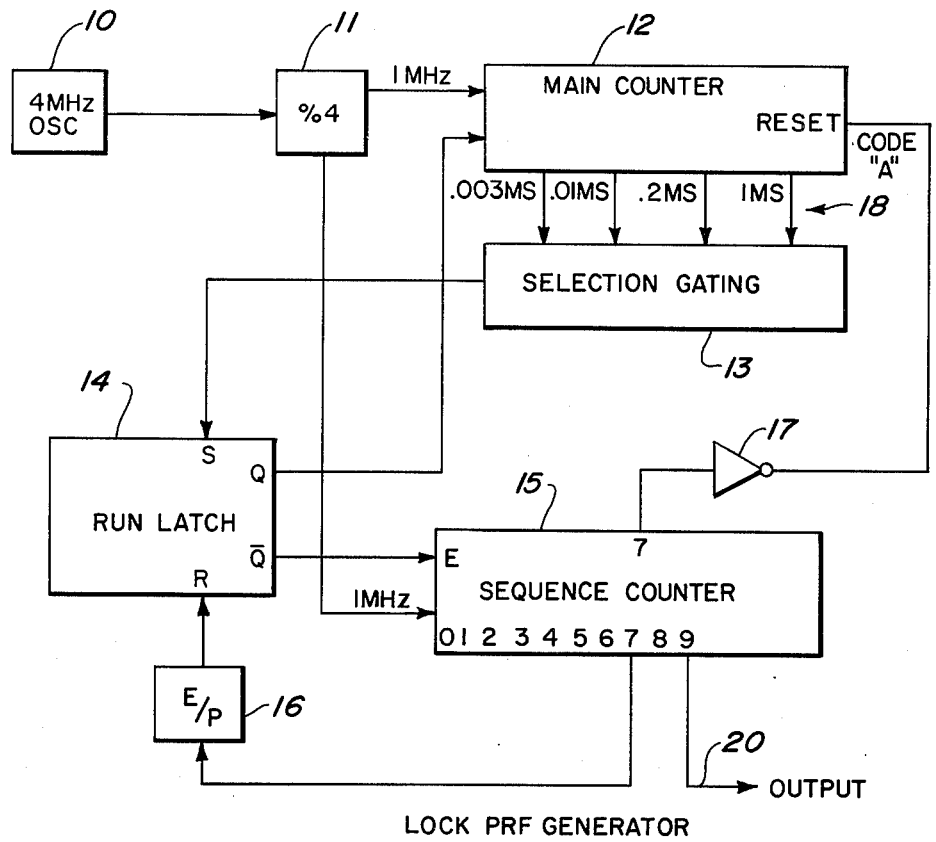
FIG. 1
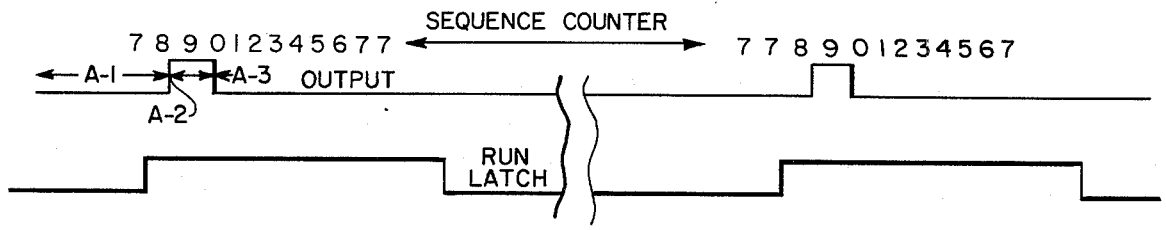
LOCK PRF GENERATOR

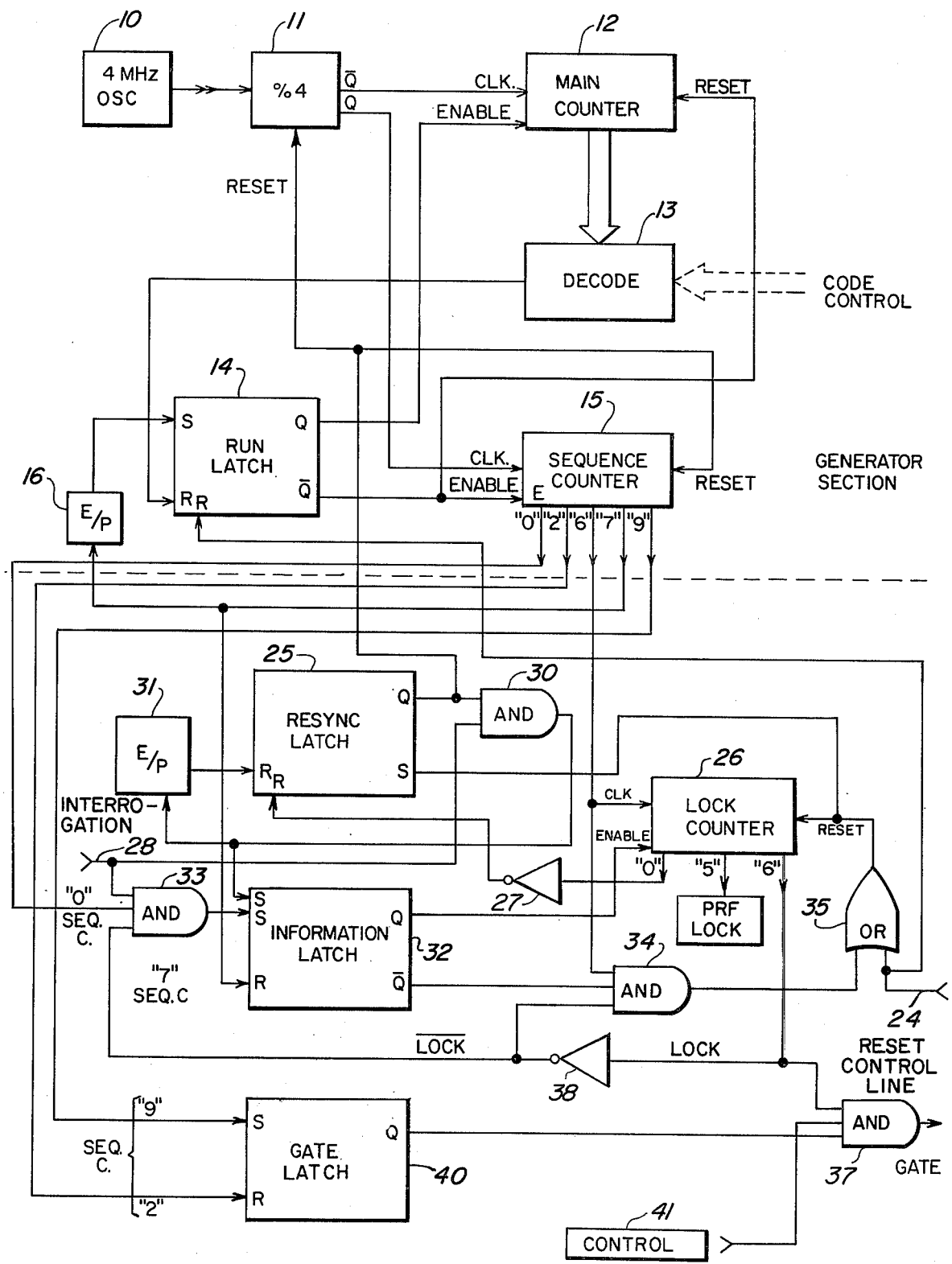

SECURE ENCODER FOR TRILATERALIZATION LOCATOR UTILIZING VERY NARROW ACCEPTANCE PERIODS

This invention relates to radar systems utilizing encoding techniques to distinguish between various ones of many transponders or other radar stations, and more particularly to securely encoded systems which reject stray signals.

Reference is made to a copending patent application entitled "RADAR TRILATERALIZATION POSITION LOCATORS," Ser. No. 195,687, filed Nov. 4, 1971, James W. Merrick, inventor, now U.S. Pat. No. 3,810,179, issued May 7, 1974. The subject invention provides a similar system having a greater reliability, with less susceptibility to interference from stray signals.

The Merrick patent application shows a method of transmitting encoded microwave pulses to any one of many transponder stations. Each transponder station identifies signals directed to it by timing the interval between successive interrogation pulses. If the timed interval agrees with recognition circuits built into the transponder, it responds.

However, if there are stray signals in the area, one signal could occur at the end of the prescribed interval and appear to be a valid signal. The transponder detecting such an apparently valid signal could then lock onto it, and the system would fail. Hence there is room for improvement by providing a system which is more trouble free and less likely to lock onto stray signals.

In greater detail, Merrick discloses a method of encoding pulse-operated, distance-measuring radar signals. The distance between stations is measured by the timing the interval required for an interrogation signal to travel to a remote station and then return to the interrogating station.

Each of several fixed-site remote responder units is made responsive to pulses received from a master interrogator station during a unique pulse repetition interval which identifies the responder station. Likewise, other stations in the system are responsive only to their own unique repetition interval. Thus, the master unit can interrogate and measure the elapsed time — which equals distance — to each of several remote units.

Merrick's decoder is activated upon receipt of an interrogation pulse picked up by a radio frequency receiver. Then, the decoder generates a timed gate signal which appears during the next timed interval, that identifies the station generating the gate signal. This gate signal time is repeated periodically, but only at the time during which the station code expects an interrogation pulse. The electronic circuit interprets the succeeding pulses received during these repeated gate signal time intervals as a command to respond to the received interrogation pulse. Merrick has a similar decoder at the master station or interrogator end of the R-F link. This master decoder also recognizes correctly timed reply pulses and undertakes the required sequence responsive thereto.

Each gate time signal, developed by the Merrick system may be adjusted by one microsecond increments (the frequency of the driving oscillator). Whenever a reset pulse coincides with one of the oscillator pulses, there is a jump (in the next time interval) of 1 microsecond. Thus, it is possible that an interfering signal from another station or system can intervene in the system timing and cause an improper time jump, which might capture one of the detectors at either end of the link, and cause erroneous readings to be recorded.

Accordingly, an object of the invention is to provide new and improved valid signal detector means. Here an object is to provide signal detectors which are more securely immune to influence responsive to randomly occurring stray signals. In particular, an object is to provide a system which logically translates incoming signals, detects valid signals and rejects false signals.

In the above identified Merrick application, a crystal controlled oscillator generates a continuous stream of pulses. A logic circuit counts the pulses in the stream and enables an acceptance gate at the end of the count. For example, nine hundred and ninety nine pulses may be counted and the acceptance gate is thereafter enabled during only the one-thousandth pulse. Then, the cycle repeats. Thus, any stray signal randomly appearing during the one-thousandth pulse might appear to be a valid interrogation signal.

With the large count capacity provided by Merrick, it is unlikely that such a spurious signal would be accepted. However, the system is much more valuable if even this small possibility is greatly reduced.

In keeping with an aspect of the invention, these and other objects are accomplished by providing a system for logically interpreting the signals received in the Merrick type system. In greater detail, after the system has counted down, it causes a very short measured time of acceptance which enables response to an interrogation signal. If there is such a signal, the system is armed by it. If another interrogation signal is received during the next window after the system is armed, it is accepted as a valid signal. Hence, the invention requires an initial count down to arm itself, a narrow acceptance time, and repeated pulsing during the successive acceptance windows after arming. This means that many variables must be satisfied simultaneously in order to simulate a valid interrogation signal.

Joint probabilities multiply. Thus, if there is, say, 1 in 10,000 chances that any one of the three variables will fail, there is 1 in 1,000,000,000,000 chances that all three variables will fail simultaneously. This makes the system much more secure.

The nature of a preferred embodiment of the invention will be understood best from a study of the attached drawings, wherein:

FIG. 1 is a block diagram showing a simplified encoder; and

FIG. 2 is a block diagram showing a decoder.

A basic block diagram of a circuit for providing an encoder (generator) is shown in FIG. 1. This circuit may be substituted directly for the circuits shown in FIG. 5 of the Merrick patent application. The encoder of the present invention is more secure than the Merrick encoder in that it depends upon the use of a more stable encoder and decoder. To make operation more apparent, the generator (FIG. 1) is detailed and then the detector (FIG. 2) is added, showing how the detector reverts to the generator type operation once the logic circuit indicates that it is receiving a proper sequence of signals. The major subdivisions of the present circuit are a crystal controlled oscillator 10, a dividing circuit 11 for reducing the pulse repetition rate of the oscillator 10, a main counter 12 for counting the divided pulses to produce any selected one of many time intervals, a gating selection circuit 13 for selecting the encoded time interval and giving an output pulse at the end thereof, a run latch 14 enabled by the gate signal, a sequence counter 15 for programming the circuit, and an end of code circuit for resetting the run latch at the end of a selected sequence count. Preferably, oscillator 10 operates at 4 MHz and divider 11 reduces the frequency to 1 MHz, although other frequencies may also be used.

In greater detail, a dual counter timing scheme is used under the control of the sequence counter 15 and the main counter 12 which alternate in their operation, under the control of the run latch 14. If the run latch is switched on, its output terminal $\bar{Q}$ is at low potential, thereby enabling the sequence counter 15 to count. On each positive going edge of the one megahertz signal from divider circuit 11, the sequence counter 15 takes one step if its enable terminal E is held at low potential by the run latch.

If the sequence counter 15 is not at its count 7, the 7 output terminal is at low potential as shown at A-1 on the curves associated with FIG. 1. This low potential is applied via an inverter 17 to the reset terminal of the main counter 12, which is thereby held at reset. When the 7 count is reached, terminal 7 goes high to high potential, as shown at A-2. When the sequence counter terminal 7 goes high, the output of inverter 17 goes low, thereby removing the reset or hold condition from the main counter 12. Also, the run latch circuit 14 is reset to an off condition responsive to a signal from circuit 16.

The run latch terminal $\bar{Q}$ goes to high potential, thereby removing the sequence counter enable at terminal E. When the run latch 14 switches off, its output terminal Q goes to low potential, thus enabling the main counter 12 which had been previously held in the reset state by the sequence counter 7 terminal high potential condition. The main counter 12 now counts until a selected one of its output terminals 18 reaches a high potential condition. For example, one code selection might occur when a selected one of the lines 18 is at high potential after 1214 microseconds.

If the selection gating circuit 13 is set to recognize this particular high potential condition at the output terminals 18, the run latch 14 is turned on responsive to the high potential applied from the main counter 12 through gating circuits 13, to terminal S. When the run latch 14 is thus turned on via the selected output at 18, the main counter 12 is stopped and the sequence counter 15 is started as at A-3 on the associated curve.

The sequence counter 15 begins counting up from 7 where it stopped. At time 9, the output 20 of the circuit is present for one microsecond. The interrogation pulse must be received during this time interval, which constitutes an acceptance window.

Thus, it is seen that the sequence counter 15 independently provides an output which is of any suitable duration such as one microsecond.

A more encompassing circuit (FIG. 2) includes a detection or decoder circuit. The objective of this circuit is to detect and align the receiver with the properly encoded interrogation signal frequency, check that such frequency persists over a period of time, and then lock the circuit into a generator operation.

The upper portion of the FIG. 2 circuit (i.e., the part above the dashed line) is the same as the previously described circuit of FIG. 1. The detector or decoder additions to the basic circuit of FIG. 1 are shown below the dashed line. These additional circuits provide a reset control over the divide by 4-counter 11, a reset of the sequence counter 15, and an increased use of the sequence counter 15 outputs.

In order to fully understand the detector operation, it should be thought of as having the four separate states of operation known as arm, test, lock, and re-arm. Briefly, these four states may be described in the following manner.

Arm (Lock Counter = 0)

In the armed state, the decoder or detector is in a ready status. This status can be initiated or held by the reset control line 24. Once an information pulse is received, counting commences.

Test (Lock Counter = 1 to 5)

In the testing sequence, the times interval of six successive information pulses are checked. Actually, however, any number of successive pulses can be checked. Note that no output gate 37 pulses are available during a search or test sequence. Typically, a testing of this interrogation interval is carried out within 1 microsecond.

Lock

Once the lock counter reaches a count of 6, or optionally a higher number, the locked phase is reached. Upon lock-up, the decoder reverts to the generator operation only (simple counting with the sequence counter, main counter, and the run latch). The interrogation pulses no longer have a bearing upon the operation in the locked phase. The locked phase allows AND gate 37 to produce output signals which are three microseconds wide (or whatever value is desired) at intervals controlled by code control 23. Note that if control circuit 41 is connected to the AND gate 37 it may be operated to pass the signal when the locked status is achieved responsive to the 6 output from counter 26.

Return to Search

The detector can be returned to pre-start (arm) status by pulsing the reset line 24. This can be accomplished either by external equipment or simply under control of a single shot multivibrator (not shown) which is tripped by the lock counter. When the single shot multivibrator times out, it pulses the reset line 24. Alternatively, if during the initial test phase, no interrogation pulse is available, an automatic reset occurs.

The remaining parts of the circuits in FIG. 2 are represented by well known logic symbols and will become obvious from the following description of their operations.

Before the start of operations, a reset signal is applied to an external reset control terminal 24 (lower right-hand corner of FIG. 2) in order to reset circuits 14, 26 and set circuit 25.

Consider the unit as being in the armed (or search) state (i.e., it is prepared to accept an interrogation signal). The resync latch circuit 25 is set, and the lock counter 26 is reset to 0. When the resync latch 25 is thus set via inverter 27, its Q output terminal is at a high potential to enable AND gate 30 and hold the sequence counter 15 in its reset condition. The divide by 4-counter 11 is also reset.

When an interrogation signal is received at input terminal 28 (center of left-hand edge of FIG. 2), there is a coincidence with the high potential at output terminal Q of the resync latch circuit 25. Hence, the AND gate 30 conducts to set the information latch circuit 32 via its terminal S and to reset the resync latch circuit 25 via an edge pulse circuit (E/P) 31 and the terminal R. The resync latch terminal Q goes to low potential, removes a reset signal and allows the divide by 4-counter 11 and the sequence counter 15 to begin counting signals which now appear at its CLK input terminal.

When the sequence counter 15 reaches a count of 6, the lock counter 26 is stepped via its clock input CLK, since the lock counter enable input terminal is now marked by the high potential at terminal Q on the information latch circuit 32. The lock counter 26 now contains a count of 1. (At any count other than 0, the resync latch circuit 25 is held reset by the output of an inverter 27.)

At time 7 in the output of the sequence counter 15, the run latch 14 is set via an E/P circuit 16, thus enabling the main counter 12 to begin to count the output signals from the divide by 4-counter 11. The main counter counts down until its reaches a count selected by the decoder 13 as controlled from the CODE control input terminal. After decoding the output of the main counter 12, according to a desired gating signal fed into the decode circuit 13, the run latch 14 is reset at terminal R' and the sequence counter 15 continues to operate responsive to clock pulses at its terminal CLK.

At time 0 in the output of the sequence counter 15, the AND circuit 33 is enabled and awaiting receipt of the next interrogation signal at input terminal 28. Note that inverter 38 energizes the lower input of AND gate 33 at all times except time 6 in the output of the lock counter.

The incoming interrogation signal must arrive with a one microsecond period defined by the sequence counter 0 output, in order to set the information latch circuit 32. More particularly, if the information latch circuit 32 is set at time 0 in the sequence counter 15, the lock counter 26 is enabled from information terminal Q and stepped by pulses at its input terminal CLK to store a count of 2. Responsive to each incoming interrogation pulse at 28, the sequence described in this paragraph is repeated until either the incoming interrogation signal does not aligh in the one microsecond acceptance window (0 output from circuit 15) or the lock counter 26 reaches a count of 6.

If the interrogation signal does not appear in the acceptance window, the information latch circuit 32 fails to be set instead of stepping the lock counter 26. When lock counter 26 is not set there is an output from circuit 32 terminal Q̄. Inverter 38 is on all of the time except on lock counter 26 output 6. Therefore, at the sequence counter time 6, the lock counter 26 is reset via AND circuit 34 and OR circuit 35. The complete unit now reverts to the armed state as described above.

If the lock counter 26 reaches the lock state (at its count of 6), inverter 38 turns off, and the AND circuit 34 is gated off to stop all detection. Once this locked condition occurs, the AND circuit 37 is enabled at its upper input. Each time the sequence counter 15 thereafter reaches a 9 count, the gate latch 40 is set and its output terminal Q has an enabling potential for the AND gate 37. Reset of the gate latch 40 occurs at the leading edge of a pulse at time 2 in the output of the sequence counter 15, resulting in a 3-microsecond gate.

A reset signal at input terminal 24 returns the circuit to the original or starting condition.

The principle of the invention should now be clear. In the system of the above-identified Merrick patent application Ser. No. 195,687, a series of information pulses are sent out from a master station to a plurality of remote stations. According to the invention, each remote station operates to establish a very narrow acceptance window during which a valid interrogation signal must be received. Hence, spurious signals received at any time other than during the window will be rejected.

Those who are skilled in the art will readily perceive how modifications may be made without departing from the scope and spirit of the invention. Therefore, the appended claims are to be construed to cover all equivalent circuits.

I claim:

1. A radar station identification system wherein said system comprises a plurality of local radar stations, each of said local stations comprising means for receiving from another of said stations a train containing an indefinite number of successively occurring interrogation pulses which might have any one of many different pulse repetition rates, a local source of cyclically recurring pulses within each station, means at each local station for repeatedly counting a predetermined number of said recurring pulses from said local source, means at each of said local stations for successively defining a series of repetitive narrow time of acceptance periods which individually identifies that local station according to the repetition rate, said periods being defined responsive to each completion of said count of said predetermined number of pulses, means at each local station responsive to each train of interrogation pulses for responding to any one pulse in the indefinite number of pulses and thereafter detecting as they are received a plurality of each cyclically recurring interrogation signals appearing within said times of acceptance that identifies the local station, means at each local station for rejecting as they are received interrogation signals appearing outside of said times of acceptance which individually identifies that particular local station, and decoder means for identifying the interrogation signals addressed to said local radar stations responsive to the repetition rate of a succession of said cyclically accepted interrogation signals, whereby each of said plurality of local radar stations responds individually to only those of the received interrogation signals having the repetition rate which is addressed to the responding station.

2. The identification system of claim 1 and means responsive to any interrogation pulse for operating said decoder means through a cycle of operation involving the successive operational states of arm, test, lock, and re-arm.

3. The system of claim 2 wherein said armed state comprises means for switching said detector means to a ready status, and means jointly responsive to said ready status and received interrogation signals for counting time intervals to establish a repetition rate for any series of pulses occurring at any time within the indefinite number of interrogation pulses.

4. The system of claim 3 wherein said test state comprises means for testing each individual interrogation signal as it is received during said times of acceptance while the series of pulses occur.

5. The system of claim 4 and means responsive to the testing of a predetermined number of said interrogation signals for locking said system, and means responsive to said locked system condition for rejecting succeeding interrogation signals.

6. The radar system of claim 1 and means responsive to any interrogation signal for operating said system to a ready status, and means jointly responsive to said ready status and to each interrogation signal received during said time of acceptance for testing every interrogation signal to determine the validity and repetition rate thereof.

7. The radar system of claim 1 and means for testing a predetermined number of said interrogation signals beginning with any arbitrary interrogation pulse, means responsive to the testing of said predetermined number of said signals for locking said system, and means responsive to the locking of said system for barring access to other of said interrogation systems.

* * * * *